United States Patent [19]

Kelley et al.

[11] 4,412,293

[45] Oct. 25, 1983

[54] ROBOT SYSTEM WHICH ACQUIRES CYLINDRICAL WORKPIECES FROM BINS

[76] Inventors: Robert B. Kelley, 69 Linden Dr., Kingston, R.I. 02881; John R. Birk, 8 Spruce Ct., Peace Dale, R.I. 02879; Henrique Martins, University of Rhode Island, J-11 Old Graduate Student Apts., Kingston, R.I. 02881; Richard P. Tella, Valley Dr., Ashaway, R.I. 02804

[21] Appl. No.: 248,784

[22] Filed: Mar. 30, 1981

[51] Int. Cl.³ ............................................. G06F 15/46
[52] U.S. Cl. .................................... 364/513; 364/478; 414/730
[58] Field of Search ............... 364/513, 474, 478, 559, 364/191–193; 318/568, 640; 414/730, 777, 627, 752, 267, 268, 4, 5, 909; 358/88–91, 100, 101, 107, 139, 903; 356/390

[56] References Cited

U.S. PATENT DOCUMENTS

| 3,804,270 | 4/1974 | Michaud et al. ................ 364/513 X |
| 3,888,362 | 6/1975 | Fletcher .......................... 318/640 X |
| 3,986,007 | 10/1976 | Ruoff, Jr. ............................ 364/513 |
| 4,017,721 | 4/1977 | Michaud ............................ 364/513 |
| 4,146,924 | 3/1979 | Birk et al. ...................... 318/568 X |
| 4,187,051 | 2/1980 | Kirsch et al. ................... 364/513 X |

Primary Examiner—Joseph F. Ruggiero
Attorney, Agent, or Firm—Thompson, Birch, Gauthier & Samuels

[57] ABSTRACT

An experimental robot system using vision and a parallel jaw gripper acquires randomly oriented cylindrical workpieces piled in bins. Binary image analysis guides the gripper into multilayered piles of workpieces. Complementary information is provided by sensors on the gripper.

26 Claims, 13 Drawing Figures

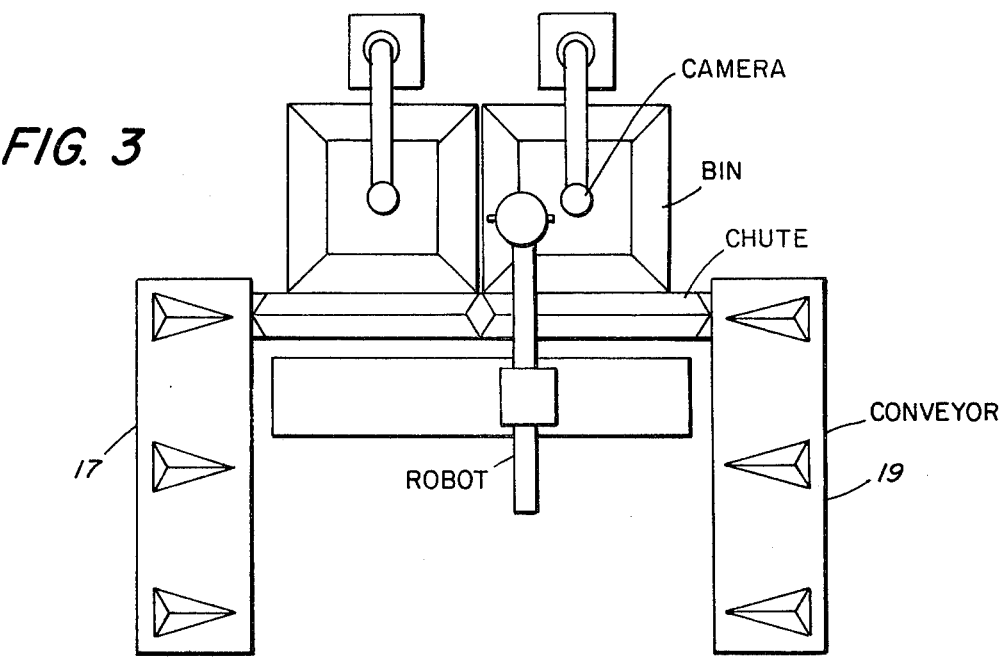
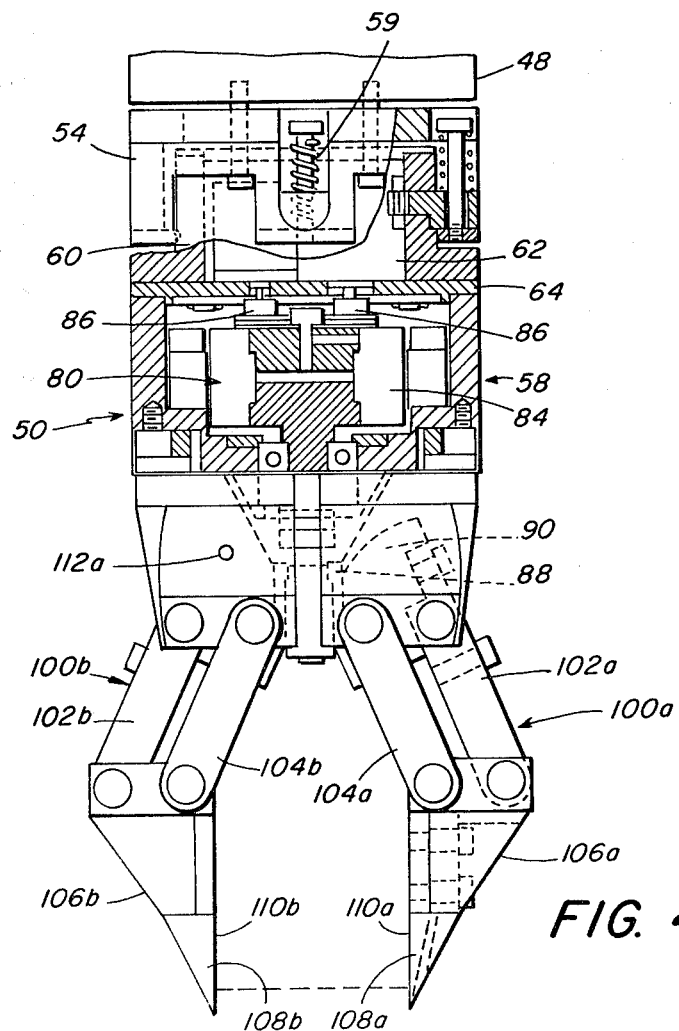

ROBOT SYSTEM WHICH ACQUIRES CYLINDRICAL WORKPIECES FROM BINS

BACKGROUND OF THE INVENTION

In many manufacturing environments, workpieces are supplied in bins. It is a common industrial problem to load machines with such pieces. Often human labor is employed to load an otherwise automatic machine with workpieces. Such jobs are monotonous and do not enrich human life. Young people today have increasingly higher aspirations for good jobs. While the cost of labor is increasing, human performance remains essentially constant. Furthermore, the enviroment in manufacturing areas is generally unhealthy and, when workpieces are inserted into machines, limbs are often exposed to danger. These factors strongly suggest that alternatives to the use of human labor be considered.

The engineering alternatives are the use of mechanical feeders, the preservation of orientation of parts throughout the manufacturing process, and the use of robots with vision to feed pieces from bins. To be viable, any approach must be competitive on an economic basis. The advantages of using robots with vision can be appreciated when the disadvantages of the alternatives are identified.

Mechanical feeders have problems with parts jamming. This is caused typically by parts which are very thin, out of tolerance or foreign. Some pieces have shapes which make them difficult, if not impossible, to orient. Some parts can be damaged by scratching against each other or against the orienting device. Large workpieces require very large feeders and substantial energy to be oriented. For vibratory feeders, vibrations may be conducted into other structures. Feed rates change with the number of parts in the feeder. Mechanical feeders often are excessively noisy. The cost and lead time to design, debug, support and changeover mechanical devices may be prohibitive. This is especially true for batch production applications. Even if a rejection mechanism is controlled by vision, most of the problems with mechanical feeders which have been cited remain.

Preserving the orientation of oriented parts is the most obvious way to avoid the problem of dealing with a bin of randomly oriented parts. This is particularly the case since commercially available industrial robots can load machines which are supplied in magazines or pallets. However, the preservations of orientation is often impractical or uneconomical. When different machines work at different rates, the rate of linked machines must be set by the slowest one. Buffer storage and line splitting and merging may be necessary to prevent the failure of one machine from stopping the entire line. If a robot is used to preserve orientation by unloading a piece from a machine rather than having the piece blown out with a blast of air and caught in a bin, the machine cycle may have to be extended and the thruput rate reduced. Other mechanisms to unload workpieces while preserving orientation may be expensive and space consuming. Pallets which are used to maintain the orientation of parts are susceptible to being upset during transfer from one workstation to another. Many machines are already set up to accomodate batch production and use stacks of bins for intermediate storage. Parts which come from vendors, long term storage or distant warehouses are usually shipped unoriented. The cost of storing or shipping oriented parts, due to low packing density, is usually prohibitive.

Due to the disadvantages of these three alternative approaches, robots with vision will be applied in the future to feeding workpieces. Their use will make it easy to change from one part to another for batch changes.

Various technical contributions have been made to the bin of parts problem. A data base of images of castings have been made available. A number of studies has been made which estimate the position and orientation of workpieces on flat surfaces, such as belt conveyors. The acquisition of a hanging part has been studied. Dihedrally tipped boxes which vibrate have been used to orient isolated parts. Overlapping parts, which are nearly horizontal, have been analyzed for position and orientation. Regions which belong to the same object have been identified in an image of a stack of blocks. The tasks of estimating the pose of pieces in the bin which were partially occluded and of acquiring only pieces which could be transported directly to a goal with a prespecified pose have been examined. Ellipses have been used to locate the circular vacuum cleaner filter which is on the "top" of a pile of similar parts. The parts of an assembly have been separated by a robot from a heap by grasping for protrusions which were located visually and by pushing with the hand at various levels. Heuristic visual methods for acquiring workpieces in bins have been described. Electromagnets have been dragged through bins to acquire billets.

Functional experimental robot systems employing special vacuum cup hands and simple vision algorithms have been described, "A Robot System which Feeds Workpieces from Bins into Machines", R. Kelley, J. Birk, D. Duncan, H. Martins and R. Tella, Proc. Ninth Intl. Symp. on Industrial Robots, Washington, D.C., pp. 339–355, Mar. 13–15, 1979; and "An Orienting Robot for Feeding Workpieces Stored in Bins", J. Birk, R. Kelley and H. Martins, IEEE Trans. Syst., Man, Cybern., Feb. 1981.

These systems had an integrated architecture which permitted all pieces to be transported to a goalsite with a prespecified orientation, regardless of which flat surface the vacuum cup acquired.

SUMMARY OF THE INVENTION

The invention broadly comprises a robot system embodying vision and a parallel jaw gripper to acquire randomly oriented workpieces having cylindrical outer surfaces piled in bins. Our system represents an advance in the technology of handling pieces supplied in bins.

The system of the invention broadly comprises an arm to position a hand in space and to rotate the hand about at least one axis relative to a bin in which are stored workpieces having cylindrical outer surfaces. The hand is a clamping-type hand secured to the arm and engages and disengages the workpieces. The workpieces typically have arbitrary orientation angles and three rotational degrees of freedom. A sensor is positioned to view the workpieces in the bin and this sensor provides data corresponding to the workpieces which data is sufficient for the selection of a holdsite. A computer communicates with the robot assembly, the sensing means and a means to store the data and the computer is adapted to guide the arm and hand to a selected holdsite on a workpiece in the bin; to relate the coordinates of the sensing means with the coordinates of the hand and to transmit the data to the robot assembly to cause the hand to engage the workpiece at the selected holdsite and to remove subsequently the workpiece from the bin.

The method of our invention includes acquiring unoriented workpieces using a clamping-type hand, some of the pieces having arbitrary orientation angles in three rotational degrees of freedom, the workpieces having a cylindrical surface which is engaged by the hand and includes collecting data about the unoriented workpieces in the bin with a sensing system, the collected data sufficient to select a holdsite for the hand on the workpieces having the arbitrary orientation angles. The specific holdsites on the workpieces are determined and selected and subsequently located relative to the hand of the robot assembly. Based on the data and relative coordinate positions, the hand is moved to engage the selected holdsite and the workpiece is engaged.

BRIEF DESCRIPTION OF THE DRAWINGS

FIG. 3 is a plan view of a system floor plan;

FIG. 4 is a front sectional view of a parallel jaw gripper;

DESCRIPTION OF THE PREFERRED EMBODIMENT

System

Figure 1:
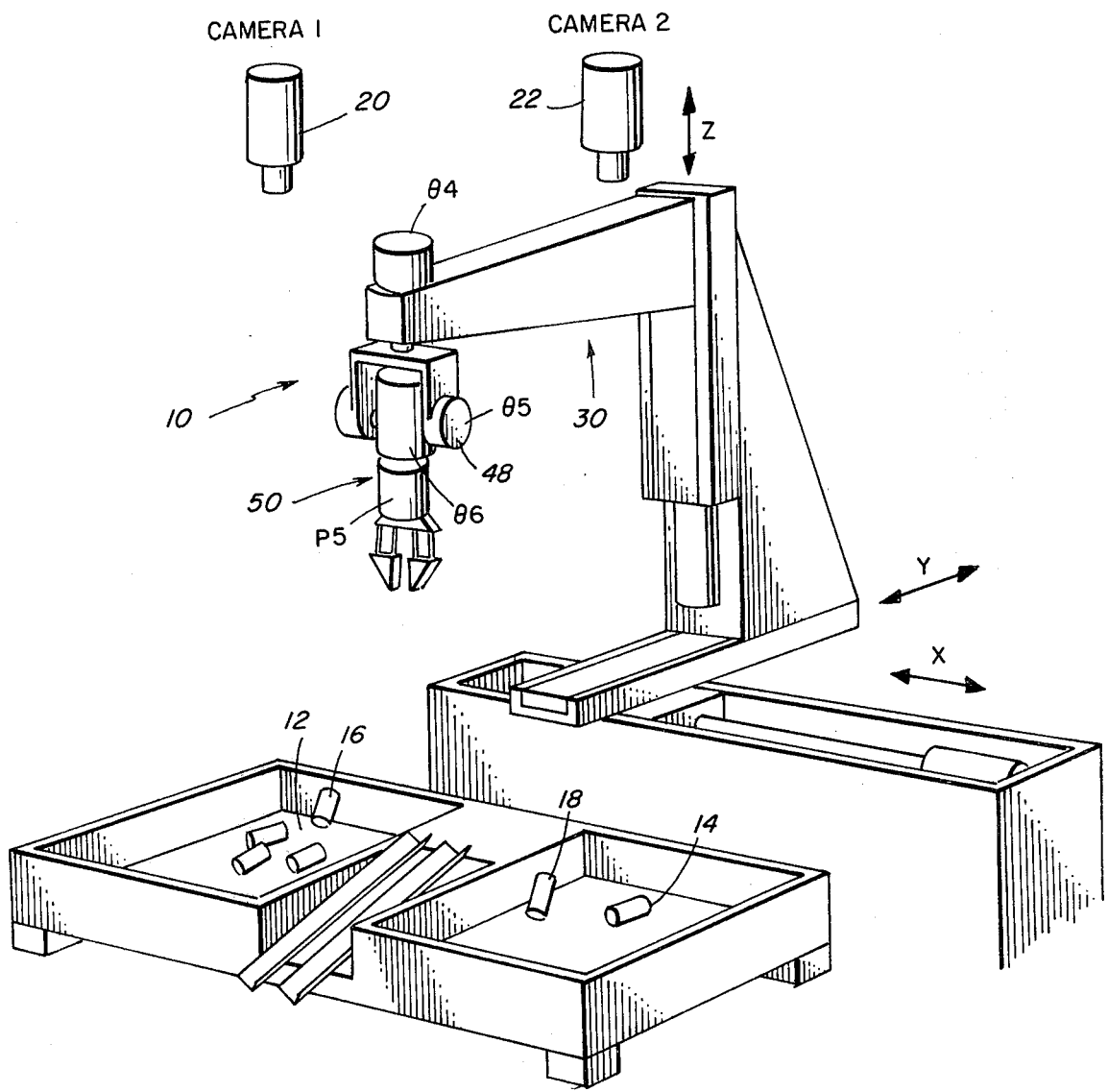
FIG. 1 is a perspective illustration of a robot system embodying the invention.

Referring to FIG. 1, a perspective illustration of an embodiment of the invention for bin picking and orienting of workpieces is shown generally at 10 and comprises two supply bins 12 and 14 containing cylindrical pieces 16 and 18 respectively; overhead dual cameras 20 and 22, a robot 30 and a parallel jaw gripper 50.

Figure 2:
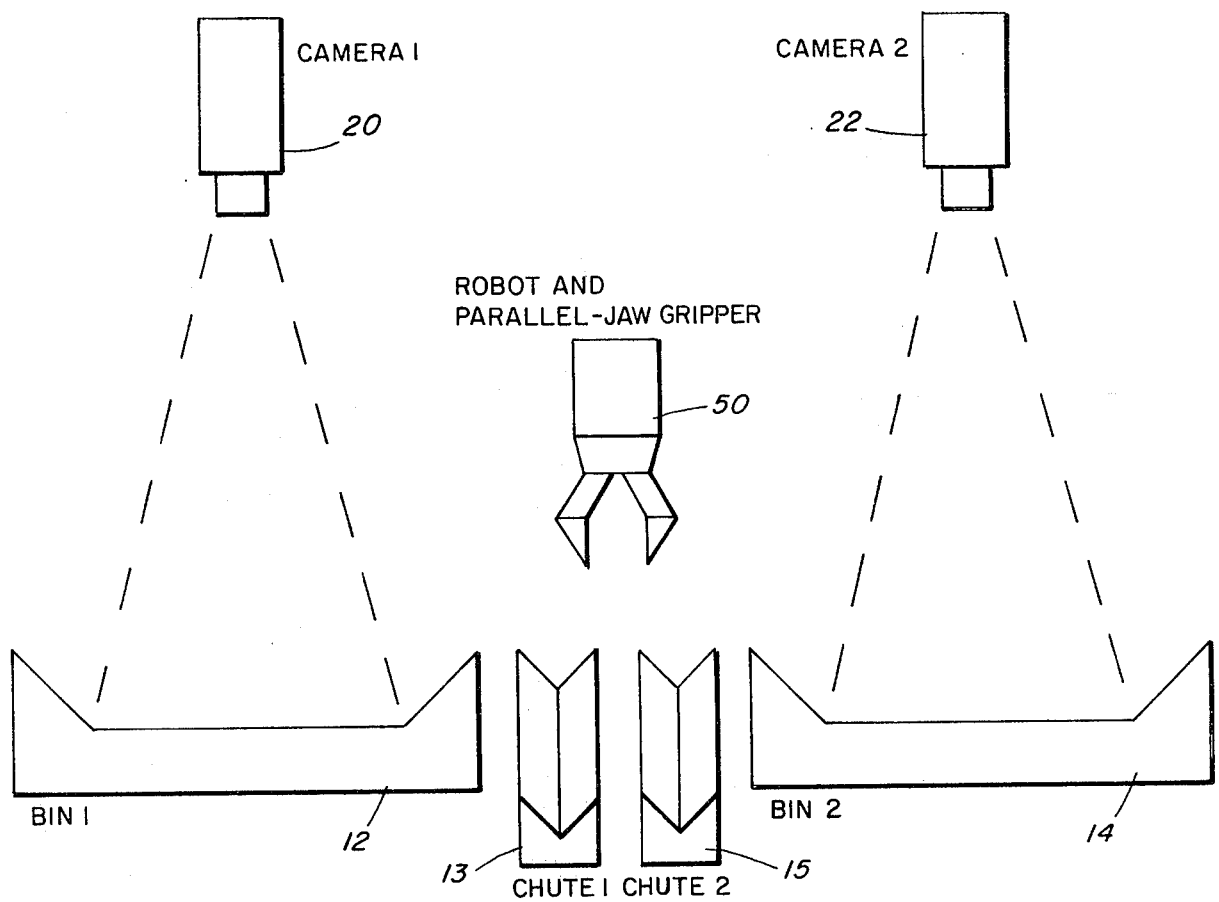
FIG. 2 is a schematic embodiment of the invention.

Referring to FIG. 2, the relationship of the cameras 20 and 22 to the bins 12 and 14 with associated receiving chutes 13 and 15, is illustrated.

The receiving chutes 13 and 15 can be used to deliver oriented pieces mounted on belt conveyors 17 and 19 as shown in FIG. 3.

The supply bins 12 and 14 have a flat bottom area the same size as the field of view of the associated overhead camera. To provide collision free access to all of the pieces in each of the bins, the sides of the bins are sloped. This clearance is required to eliminate the possibility of the parallel jaw gripper 50 colliding with the sides of the bin when the gripper attempts to acquire pieces resting on the bottom of the bin near the edge of the field of view.

The overhead cameras 20 and 22 are mounted in a position approximately above the center of each bin. The actual alignment of the cameras 20, 22 relative to the robot is determined by a semi-automatic software procedure, calibration. This procedure is performed after each camera has been aimed. The relationship between the cameras and the robot is held fixed throughout engaging and disengaging of the workpieces.

The robot as used only required four degrees of freedom including rotation about the vertical axis to align the jaws of the grippers with the axes of the cylinders. Because the depths of the cylinders in the piles are not known a priori, three continuous degrees of freedom in position in addition to the rotational degree of freedom are required.

As described below, the parallel jaw gripper 50 is symmetric by design and therefore, for orienting cylinders, can be restricted to rotations no greater than a quarter turn from a reference angle. Because of the parallel grasping surfaces of the jaw gripper 50, cylinders have only one unknown orientation angle, the angle of rotation in the plane defined by the parallel surfaces. Receiving chutes 13, 15, see FIG. 3, each include an inclined V-groove. Gravity and the design of the chute insure that all cylinders which are placed on the chute by the robot are aligned when they slide off the chute.

The robot assembly, associated computer (keyboard, image display) and peripheral equipment are commonly available as is known to those skilled in the art. For example, a robot such as a Unimation PUMA, either a Model 500 (five degrees of freedom) or Model 600 (six degrees of freedom), may be used in combination with a computer such as a Computer Automation Model LSI-2; the manufacturer's Handbook 91-20400-00A2, October 1974, sets forth the necessary program which includes the sequence of internal connections which have been added by the preparation and loading of the program into the internal memory of the computer. The computer interfaces with the robot assembly through an interface (not shown) such as a 16-bit I/O module (CAI Model 13213-00).

The video cameras 20 and 22 both interface with the computer through an interface such as a direct memory access board. The computer has a 16-bit wordlength, software floating point arithmetic and 32K words of memory. All image processing and robot assembly computations are performed in the computer. Arm joint servoing is effected by a controller (not shown).

Further, it is well known to those skilled in the art that the computer comprises suitable control storage and computation units for performing various arithmetic and logical functions on data which it possesses in digital form. Any standard computer language consistent with the capability of the computer can be used for the instructions. All subroutines are not described in detail since they can be written in any desired notations, formats or sequence, depending upon the particular computer being utilized, computer language, etc. Programs and instructions described are put in terms of structural flow. When necessary and applicable for purposes of the invention, individual programs are described.

Parallel Jaw Gripper

The parallel jaw gripper 50 is secured to the wrist 48 of the robot assembly. The gripper 50 includes fingers having opposed facing parallel surfaces which engage the workpieces.

A single actuator system controls the position of both fingers. For the programmable finger openings for different size pieces a position control system uses a motor position encoder. For bin-picking applications, the fingertips must be small enough to get between closely packed pieces. The tips preferably are mechanically smooth with no projections which could get caught on pieces. Further, the tips should only be wide enough to keep large off-center pieces from rotating so that a minimum clearance space is needed for the fingers to grasp the piece.

Referring to FIG. 4, the gripper assembly 50 comprises a compliant overload structure 52 attached to the wrist 48. The structure 52 includes a circular plate 54 having a depending wall 56. Secured to the structure 52 is a cylindrical housing 58 having an upper section 60 and a lower section 80.

The structure 56 holds housing 58 using three or more preloaded compression springs 59. Overload forces and torques on the gripper are permitted to be relieved with automatic resetting when the cause of the overload is removed. This is effected by the optical limit switch sensing the movement which corresponds to the overload. The signal from the optical limit switch to the computer results in a reversal of the motion which caused the overload.

The upper section 60 of the cylindrical housing is secured in the wall 56 and contains a digital position encoder 62 and a tachometer 63. A mounting plate 64 also serves to hold the printed circuit board for sensor electronics. The lower section 80 depends from the plate 64 and houses a d-c torque motor 84. Antibacklash gears 86 are secured in the section 86 and are used to drive the tachometer and encoder.

Secured to the lower section 80 are finger assemblies 100(a) and 100(b).

The motor 84 drives the worm and sector gears 88 and 90 respectively which in turn drive the finger assemblies 100(a) and 100(b).

The parallelogram finger assemblies 100(a) and 100(b) are attached as follows: pairs of outer linkages 102(a) and 102(b) are free to rotate at both ends; inner linkages 104(a) and 104(b) are attached to the sector gears 90 at the upper ends (the sector gears driven by the worm gears) and are free to rotate at their lower ends. The linkages are attached to finger support blocks 106(a) and 106(b); and fingertips 108(a) and 108(b) attach to the support blocks 106(a) and 106(b) respectively. This feature permits easy fingertip replacement. The fingertips have flat opposed parallel surfaces 110(a) and 110(b).

Optical limits switches (only one shown at 112(a)) are used to sense the presence of an overload condition. The overload signal is used to alter the execution of the piece pickup program. An optical limit switch is also employed to establish a reference opening position for the fingers. The finger opening is determined by reading an incremental position encoder on the motor 66 and evaluating a function to determine the opening of the fingers. An inverse relationship is used to set the motor position encoder to obtain a particular finger opening. Measurement of finger opening can also be used for in-process inspection or to determine which side of a rectangular bar is being grasped, for example.

The fingertips 110(a) and 110(b) are equipped with an infrared transmitter-receiver pair (not shown) which provides a light beam between the two tips. To obtain reliable performance, the transmitter is pulsed (10% duty cycle) and the receiver is synchronized with the pulses. The interruption of the beam is used to detect the instant when a piece passes between the fingertips as well as to verify that a piece is present when the fingers are closed.

Gripper Software

Gripper software has three functions: (1) position initialization; (2) fingertip distance setting and measuring; and (3) pickup sequencing. Position initialization is required because incremental position encoders are used. Position initialization establishes a reference zero position by the following actions. The fingers are opened until the optical limit switch closures are sensed. The enclosures are zeroed and then commanded to close by a fixed offset distance. The encoders are zeroed once again to establish the reference zero relative to the optical limit switch position.

Fingertip distance setting and measuring are accomplished indirectly since the position encoder is mounted on the motor shaft and not on the sector gears. It is possible to compute the functional relationship between motor position encoder counts and fingertip distance; however, an alternative procedure is employed which used calibrated blocks to obtain data points of distance versus encoder counts from which polynomial approximations are generated. A polynomial of degree four is used to determine the number of encoder counts necessary to obtain a given fingertip opening. A polynomial of degree there is used to determine the actual fingertip opening given the encoder count reading. Employing the least square error polynomial approach eliminates the need to verify the mechanical dimensions and alignments which are assumed in any geometric analysis. Further, any deviations from the ideal are automatically accounted for by the curve fitting approach whereas a new geometric analysis could have been required.

The gripper pickup sequence begins by obtaining a schedule of three fingertip distances, the line of sight vector space coordinates, and the direction of the gripper opening. The rotated fingers are opened to distance No. 1. The fingertips are moved down along the line of sight vector toward the holdsite until the fingertip sensor is interrupted. The fingers are then opened further to distance No. 2 and the downward motion is continued an additional grasping distance. The fingers are closed to distance No. 3 corresponding to the width of the workpiece to be grasped, and then the gripper is moved up to the traverse plane. This simple procedure accomplishes the acquistion of pieces having unknown depths in the bin.

Vision Analysis

Vision analysis of the bin image is divided into two parts. The first part checks the image for the presence of objects which need to be further analyzed. This check is performed to determine the absence of workpieces. A second part continues the analysis to select a holdsite location and direction. This analysis is performed within the task PICTUR.

Vision analysis is initiated when a gray scale image of the pieces in the bin is obtained. The intensity value of each pixel (picture element) is compared with a common threshold to create a binary image. The first operation in the analysis is the application of a shrinking operator. The shrinking operator is applied to the successive images to reduce the total number of pixels which are collected for holdsite selection. These pixels are clustered and the clusters are sorted by size. The largest cluster is selected and the centroid, eigenvectors and eigenvalues of that cluster are computed. The location and direction of the gripper fingertip opening relative to the image is obtained from the centroid location and the major eigenvector direction. The ratio of eigenvalues determine which fingertop opening schedule is used: cylinder on end; or, cylinder inclined or flat.

A vector in space is defined by the image location of the centroids of the selected cluster. The vector is the projection of the centroid along the line of sight. During acquisition, the fingertips of the gripper travel along the line of sight path.

The shrinking procedure is performed as follows: Given a gray scale image G and a threshold T, create a binary image $S_0$. Specifically, $$S_0(i,j) = \begin{cases} 1, & G(i,j) \geq T \\ 0, & \text{otherwise,} \end{cases}$$

$S_0$ has a shrink level of zero. Let $N_0$ be the number of zeros in the image and $A_1$ be the number of ones. Define an indicator function $\delta_k$ as $$\delta_k(i,j) = \begin{cases} 1, & S_{k-1}(i,j) = k \\ 0, & \text{otherwise.} \end{cases}$$

Then $$N_0 = \sum_{i,j} [1 - \delta_1(i,j)]$$

and $$A_1 = \sum_{i,j} \delta_1(i,j).$$

Given an image $S_{k-1}$, the image $S_k$ is created by incrementing all pixels having value k which are totally surrounded (in the 8-neighbor sense) by pixels having value k. That is, $$S_k(i,1) = \begin{cases} k+1, & \sum_{l=-1}^{1}\sum_{m=-1}^{1} \delta_k(i+l, j+m) = 9 \\ S_{k-1}(i,j), & \text{otherwise.} \end{cases}$$

The total number of (k+1)s in the image $S_k$ is $$A_{k+1} = \sum_{i,j} \delta_{k+1}(i,j)$$

and the total number of k's is $$N_k = A_k - A_{k+1}.$$

Figure 5:
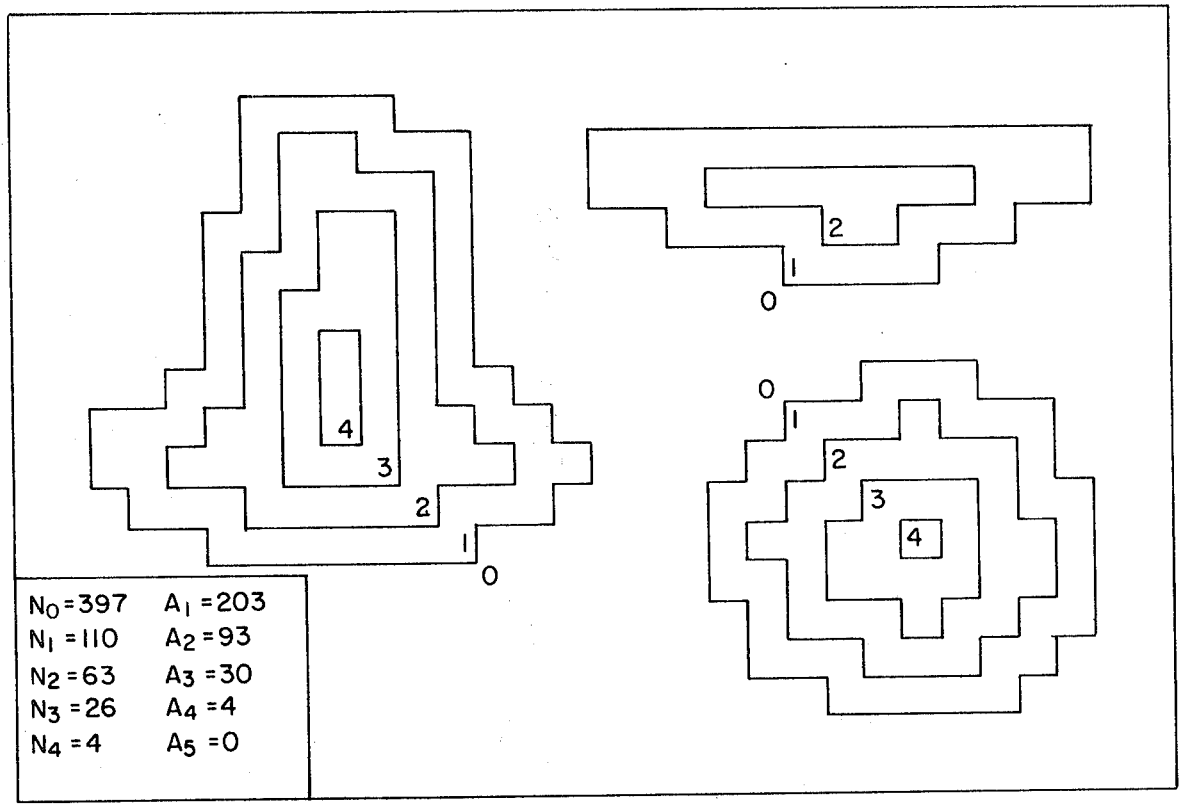
FIG. 5 is an example of the shrinking procedure.

An example of the application of shrinking to a 20×30 pixel image is shown in FIG. 5. The progression shown in the $A_k$ list demonstrates the effect of shrinking on the number of active pixels. After shrinking one level, the number of active pixels is 93, a reduction of 110 from the original 203. The 93 pixels include all of those labelled 2, 3 or 4. Notice that after two levels of shrinking, only two active clusters remain.

Shrinking is terminated when the image $S_L$ has the properties that $$N_1 \leq MAXPIX < N_{L+1}$$

and $$0 < MINLEV \leq L \leq MAXLEV,$$

where MAXPIX is a parameter which controls the number of pixels given to the clustering program and MINLEV, MAXLEV are parameters which bound the shrinking effort.

Clustering time grows with the square of the number of active pixels. If $N_{MAXLEV} > MAXPIX$, this means that the field view is too large and should be reduced. Such would be the case for small pieces when too many pieces fill the field of view. A way to deal with the latter problem is to restrict the number of active pixels to those within a subimage window. The maximum shrinking level is chosen such that all good pieces are gone and only foreign objects remain.

When shrinking is terminated, the $N_L$ pixels having value L are clustered by distance, the clustering starts with $N_L$ clusters. Two pixels are put in the same cluster if the (city-block) distance between them is less than the clustering distance. The resulting clusters are sorted according to size. If the sizes are above a minimum MINPIX, holdsites are computed for the three largest clusters; the primary holdsite corresponds to the largest holdsite. The direction of the major eigenvector provides the direction of the holdsite for the parallel jaw gripper. The ratio of the eigenvalues is used to distinguish between cylinders which are on end (ratio almost one) and those which are not. The appropriate fingertip opening distance schedule is then used.

In the event that the largest cluster is smaller then MINPIX, a window is placed about its center of gravity location and the clustering process is repeated using only pixels having value L−1. If this procedure does not result in any clusters larger than the minimum size MINPIX, no holdsite is selected. The selection failure is noted and the vision analysis is terminated. When selection failures occur in all windows in the cycle a message to the operator is generated.

The locations of holdsites where unsuccessful acquisition attempts occur are kept in a short term memory. To prevent repeated unsuccessful attempts to acquire the same piece in the same way, a failure hole pattern is put into the binary image $S_0$. The pattern is centered on the failure location pixel and consists of replacing the center pixel and its four-neighbors with zeros. The effect of the failure hole is to cause subsequent holdsites to be selected some minimum distance from the unsuccessful one.

Figure 6:
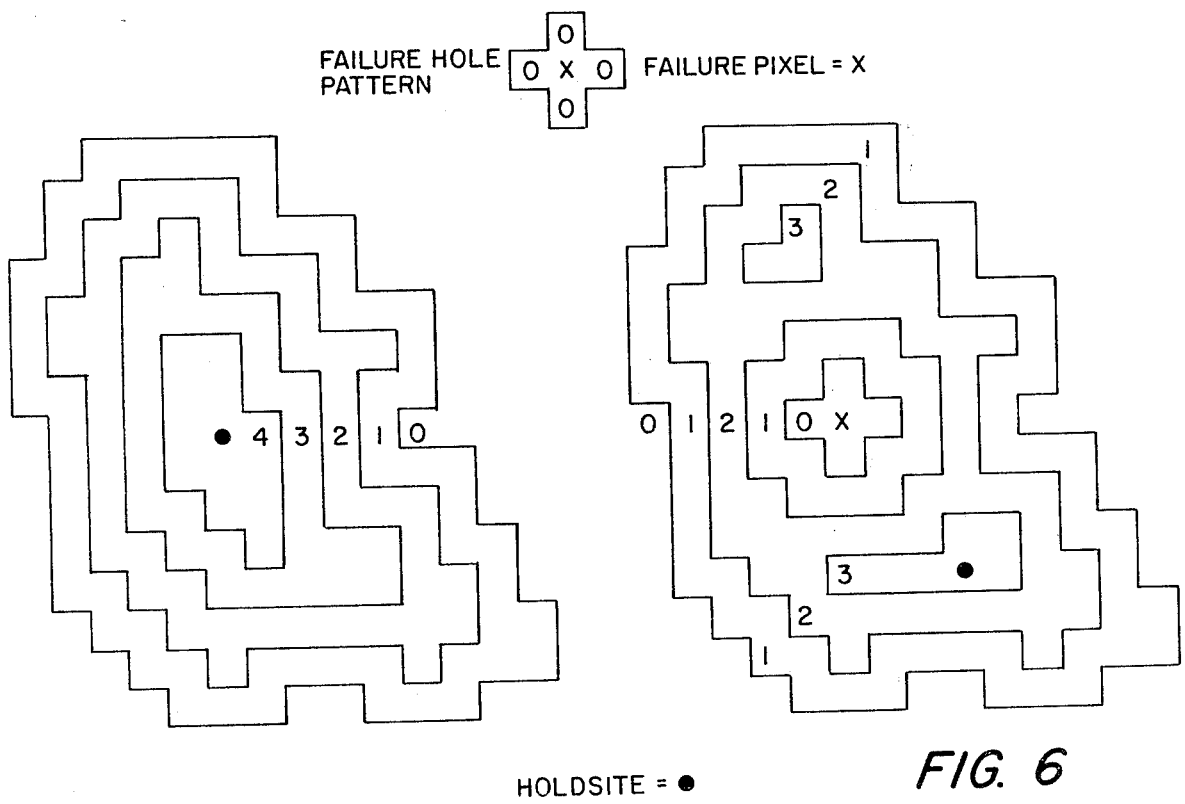
FIG. 6 illustrates the effect of a failure hole.

An example of the shifting of a holdsite when a failure hole is put into a pixel cluster is shown in FIG. 6. Here, the failure hole pattern causes two clusters to be created which are approximately equidistant from the failure holdsite and the periphery of the original cluster.

Robot vision in general requires knowledge of spatial projections of image points. Given a known plane, the coordinates of the piercing point of a line of sight projection vector is easily determined. Then spatial quantities such as distance, angle and area can be computed from image data.

Relating image measurements to spatial measurements requires an accurate camera model. When angular measures (light ray to light ray) are interpreted as linear ones, spherical distortion errors result, even if the lens is perfect. In practical applications, it is desirable to use the entire field of view of the camera out to the edge and not be restricted to the central zone and give up resolution.

For the experiments described hereinafter, a least square error second order polynomial approximation was used.

Figure 7:
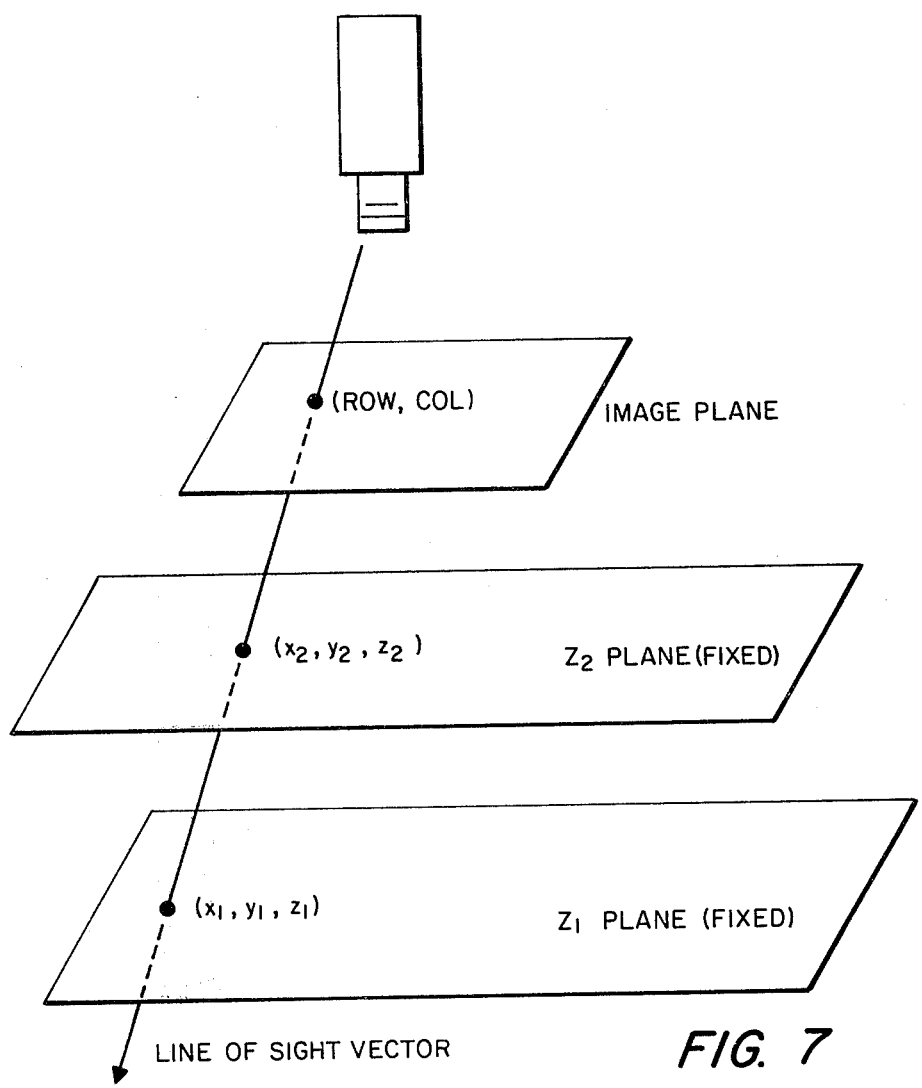
FIG. 7 illustrates line of sight vector geometry.

The line of sight vector is obtained by computing the coordinates of two piercing points in planes fixed relative to the camera. The geometry of the calculation is shown in FIG. 7. Given the row and column location of an image point, the coordinates of the piercing points in the fixed planes $Z_1$ and $Z_2$ are computed. The values of $x_1$, $y_1$, $x_2$ and $y_2$ are computed by evaluating individual functions of the form $$\overline{V} = aR^2 + bC^2 + cRC + eC + f$$

where V=coordinate value $x_1$, $y_1$, $x_2$ or $y_2$ R=row coordinate, C=column coordinate, and (a, b, c, d, e, f)=the least square coefficients.

Figure 8:
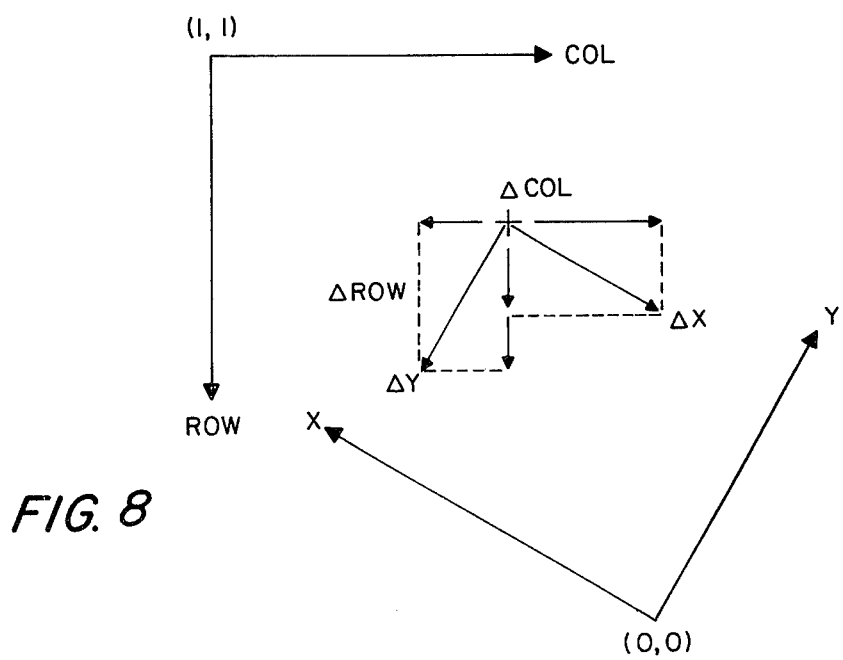
FIG. 8 is an illustration of camera calibration.

The least square coefficients are obtained by collecting sample points in both plane $Z_1$, and $Z_2$. A regular n×n sampling grid is used. Because the robot coordinate axes (X and Y) might not be aligned with the camera coordinate axes (ROW and COL), test moves are made with a circular calibration chip at the center of the field of view. These moves provide an interpolation formula which allows the calibration chip to be placed roughly at a particular sample point. The interpolation formula is obtained by moving the chip in the X-direction only measuring the motion of the chip image then repeating the test for the Y-direction as shown in FIG. 8. These motions are related as $$\Delta R = S_{11}\Delta X + S_{12}\Delta Y$$

$$\Delta C = S_{21}\Delta X + S_{22}\Delta Y$$

where $S_{11} = (\Delta R/\Delta X)_{\Delta Y=0}$, $S_{21} = (\Delta C/\Delta X)_{\Delta Y=0}$, $S_{12} = (\Delta R/\Delta Y)_{\Delta X=0}$ and $S_{22} = (\Delta C/\Delta Y)_{\Delta X=0}$. By inverting this relationship an interpolation formula is obtained which yielded an approximately uniform image plane sampling grid when the chip is moved according to $$\Delta X = (S_{12}\Delta C - S_{22}\Delta R)/D$$

$$\Delta Y = (S_{21}\Delta R - S_{11}\Delta C)/D$$

where $D = S_{12}S_{21} - S_{11}S_{21}$.

Once the $n^2$ samples in each plane are taken, the data is used to obtain the least square error set of coefficients for each coordinate in each plane. A formal presentation of this computation follows. Denote the row value by R, the column value by C and corresponding coordinate value $x_1$, $y_1$, $x_2$ or $y_2$ by X. Define the image row-column data vector as $$J_i = (R^2, C^2, RC, R, C, 1), i = 1, \ldots, n^2.$$

Define the coefficient vector for the corresponding coordinate $x_1$, $y_1$, $x_2$ or $y_2$ as $$A = (a, b, c, d, e, f)^T.$$

For each coordinate data point $$X_i = J_i A, i = 1, \ldots, n^2.$$

Then for all the data points $$X = [J]A$$

where $X = (n \times 1)$-vector of $X_i$ and $[J] = (n \times 6)$-matrix with rows $J_i$. The least square coefficient vector A is given by $$A = ([J]^T[J])^{-1}[J]^T X$$

where the matrix product gives the usual pseudo-inverse matrix.

Top Level Software

Figure 9:
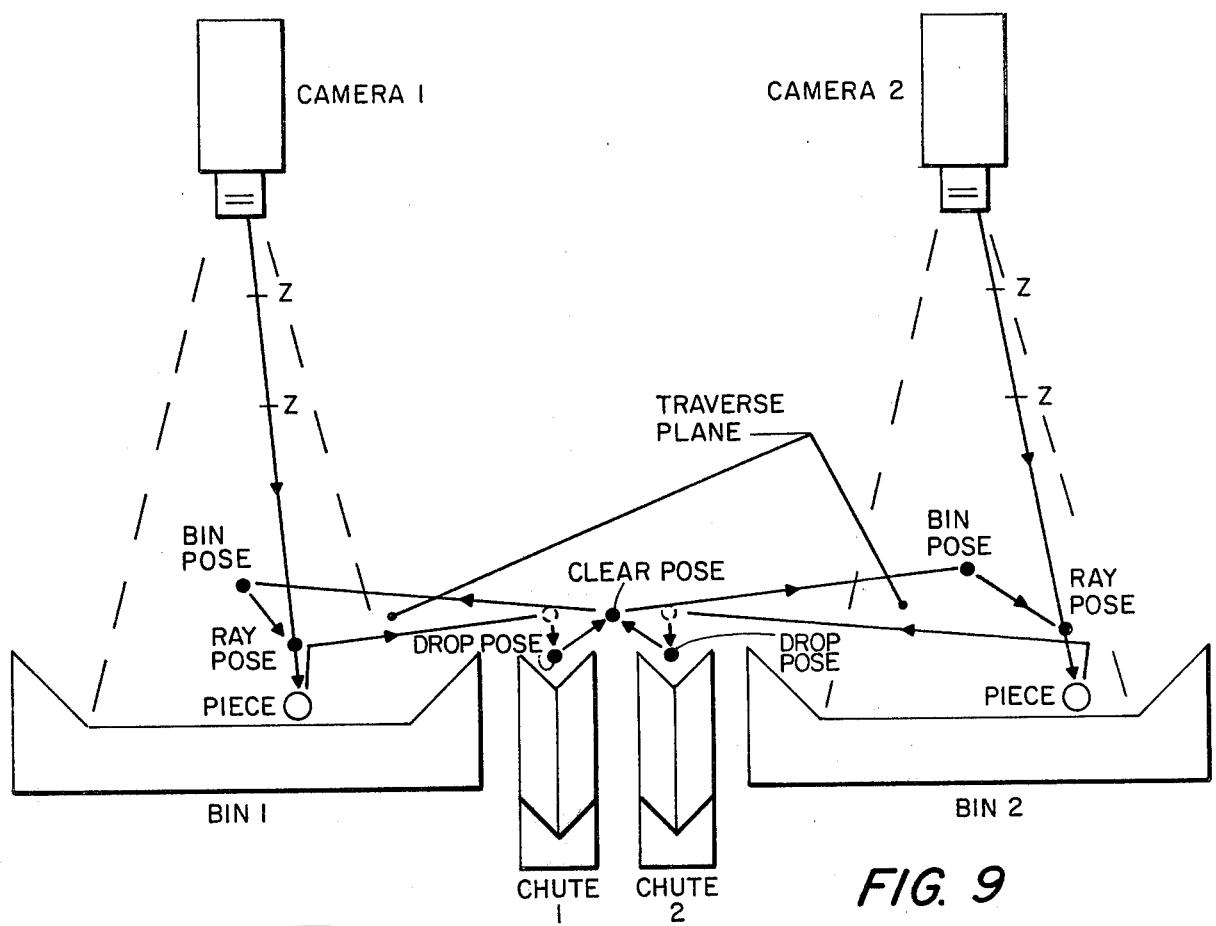
FIG. 9 is a schematic of a dual-bin execution cycle.

Experiments were performd using both a single bin of pieces and two bins with different pieces. The software description given here is for the dual bin configuration, the single bin is similar. The execution cycle for this case is illustrated in FIG. 9. The cycle starts when the gripper is at the CLEAR pose above the chute and a 'clear' signal is issued. An image of the pieces in a bin, say bin 16, is brought into the computer and the first part of the image analysis is begun. Assuming the previous image analysis for the other bin, bin 14, was completed, a 'ready' signal causes the gripper to be sent directly to the RAY pose in the TRAVERSE plane. If the 'ready' signal has not yet been issued, to minimize motion delays the gripper is sent toward the center of the bin, BIN pose, while the analysis continues. (The gripper is redirected to the RAY pose as soon as the 'ready' signal is received). The pickup sequence is initiated starting at the RAY pose. The gripper is aligned with the holdsite direction and is sent down along the line of sight path. Piece pickup is performed and the gripper moves up to the TRAVERSE plane. Then the gripper moves to a pose above the DROP pose and verifies that a piece is in the gripper. If a piece is held, the gripper moves to the DROP pose close to the chute, drops the piece and then moves to the CLEAR pose. If no piece is held, the gripper moves directly to the CLEAR pose. A 'clear' signal is issued and the second half of the cycle is executed with an image of the bin just picked being brought into the computer for analysis and the gripper being sent to the bin previously analyzed. The nominal execution cycle continues this pattern of alternating analysis followed by pickup in each bin.

The software was organized as four concurrent tasks which ran under the control of a multi-task real-time execution system. Th first of the four tasks is the main task, MTASK, which initiates the dual bin picking cycle. The cycle described in the preceding paragraph is actually composed of three tasks: NEAR, PICTUR, and DPICK.

Figure 10:
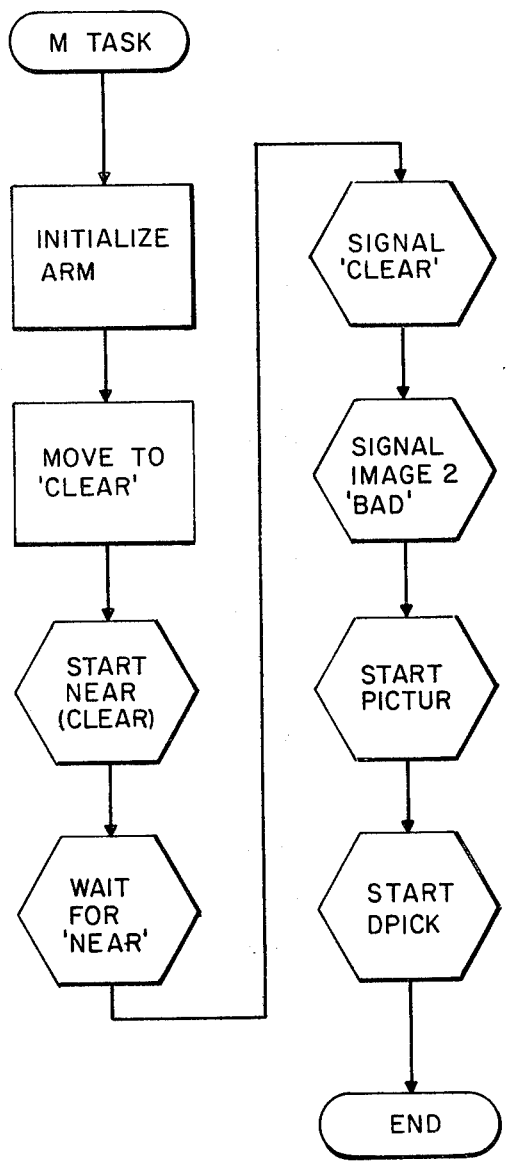

The flowchart for the main task, MTASK, is shown in FIG. 10. First the arm is initialized by establishing reference zero positions for all degrees of freedom including the fingertip opening. Next, the arm is commanded to move the gripper to the CLEAR pose. The task NEAR(CLEAR) is invoked and execution of MTASK is suspended until a 'near' signal is received. Parameters are set to cause the cycle to start by analyzing the bin 1 image and to cause the gripper to wait for the analysis to be completed by signalling that image 2 was bad. MTASK then starts the tasks PICTUR and DPICK with DPICK being assigned a higher priority. Then MTASK terminates.

Figure 11:
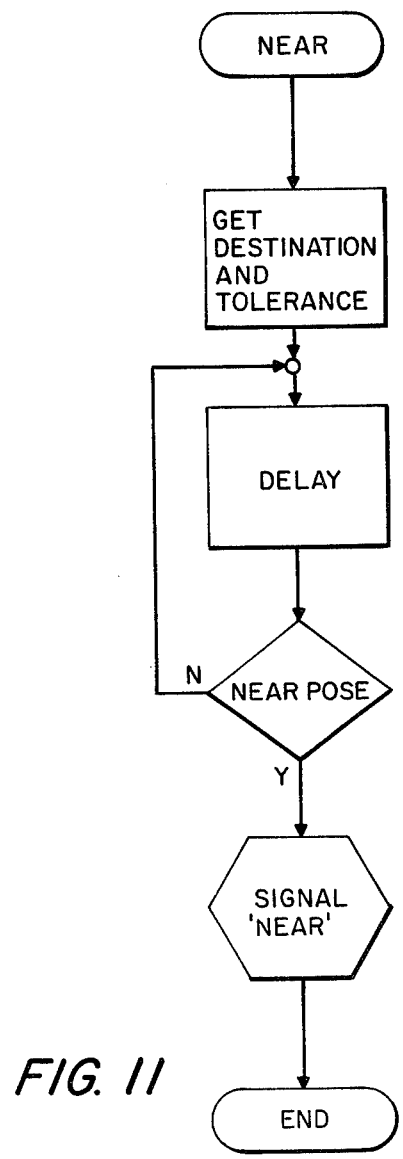

The task NEAR flowchart is given in FIG. 11. This task checks how near the pose of the robot is to a specified destination pose and issues a signal when the pose is 'near'. The task waits a few ticks (10 ms) of the real-time clock before reading the arm joint coordinates and computing the distances from the arm joint destinations. These distances are compared against a list of tolerances for the desired pose. If any distance is too large, the procedure is repeated. When all of the distances are within the tolerances, a 'near' signal is issued and the task is terminated.

Figure 12:
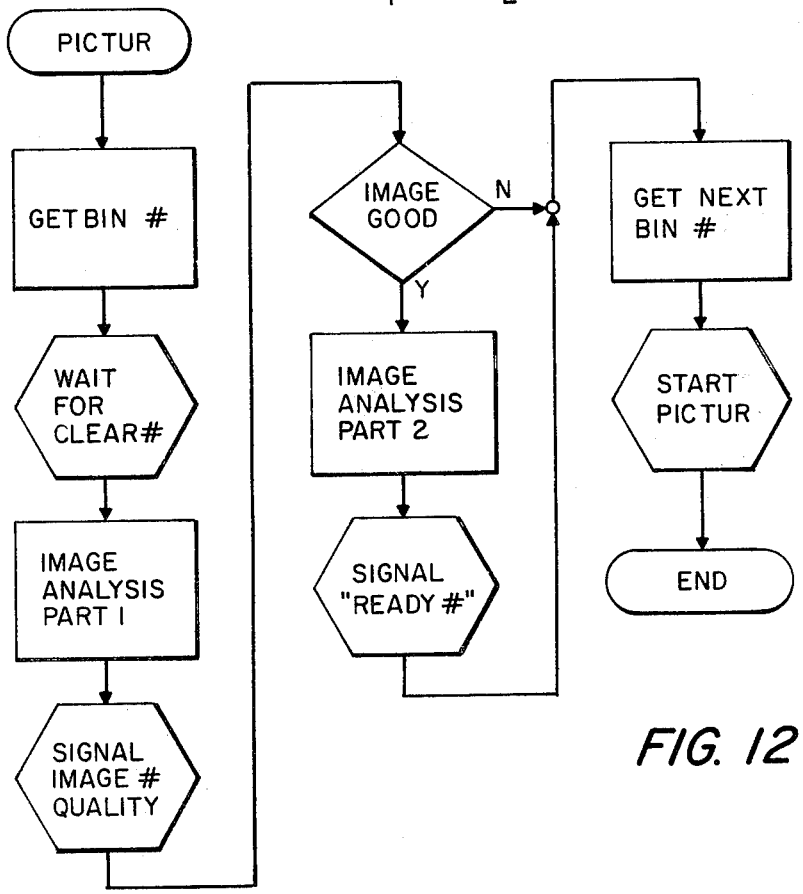
FIGS. 10, 11, 12 and 13 are task flow charts.

The flowchart for task PICTUR is shown in FIG. 12. This task performs all the image analysis and supplies the line of sight and holdsite data to the task DPICK. The task begins by getting the number of the bin to be analyzed. When a 'clear' signal is received, the image of the bin is brought into the computer and the first part of the image analysis is performed. A test is made for image quality and an image quality signal, good or bad, is issued. If the quality is bad, the task jumps to setup the next bin image analysis and restarts the task. If the image quality is good, the second part of the image analysis is performed. The line of sight path and holdsite data is computed and then a 'ready' signal is issued. Finally, the next bin image analysis is setup and the task restarted.

Figure 13:
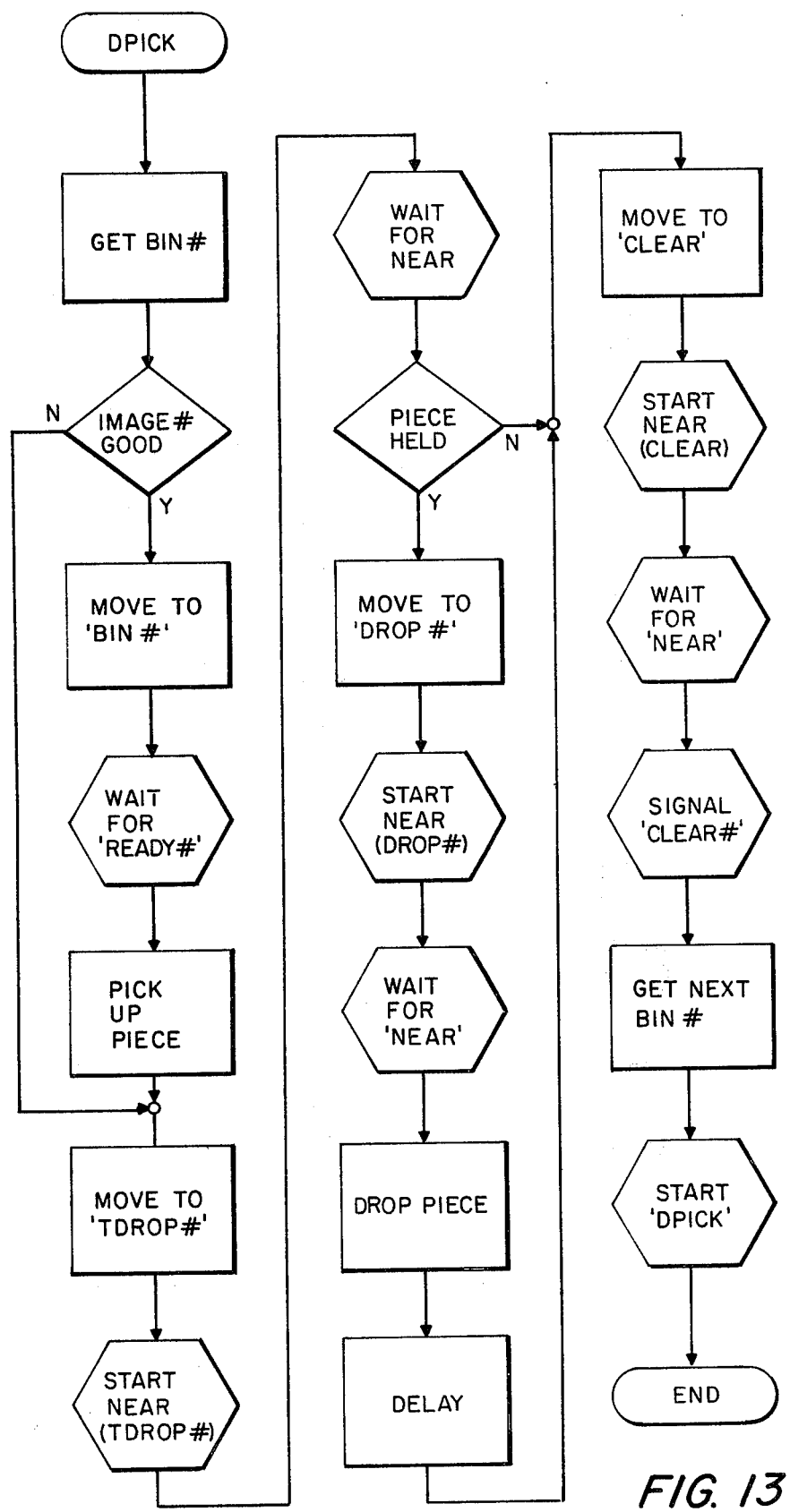

The flowchart for task DPICK is shown in FIG. 13. This task performs all of the robot motions; in particular, it executes the place pickup sequence. The task begins by getting the number of the bin to be picked and checks the quality of the image. If the image quality is bad, the arm is commanded to move to the CLEAR pose in preparation to taking another picture. If the image quality is good, the arm is commanded to move to the BIN pose. When a 'ready' signal is received, the arm is commanded to the RAY pose in the TRAVERSE plane. The 'pickup piece' operation sequence is performed by sending the gripper down along the line of sight path. The gripper is then moved up to the TRAVERSE plane, and commanded to move in the plane over the DROP pose. When a 'near' signal is received, the presence of a piece in the gripper is tested. If there is no piece, the arm moves directly to the CLEAR pose. If a piece is held, the arm is moved to the DROP pose, the piece is dropped into the chute and then is commanded to move to the CLEAR pose. When a 'near' signal is received, a 'clear' signal is issued, the next pickup task is setup and the task restarted.

The experiments used the robot system 10 shown in FIG. 1. The system employed solid state cameras 20 and 22 and the parallel jaw gripper 50. Only four degrees of freedom were needed by the arm: three for position and one to rotate about the vertical gripper axis. The system architecture was that shown in FIG. 2 with experiments performed using both a single bin of cylinders and two bins with a different size in each.

The robot arm moved slowly in comparison to current industrial robot standards. Linear axis motion did not exceed 30 mm/s and rotary motion did not exceed 90°/s. Titanium cylinders 60 mm×15 mm dia. and 76 mm×30 mm dia. were used in the experiments. Cycle times to acquire a cylinder and deliver it to a receiving chute ranged from 8–10 seconds when a single supply of one size was used. For a dual supply configuration with one bin of each size, the cycle times for one cylinder from alternate bins ranged from 5.5 to 7.5 seconds per piece.

The major cause of cycle time variation for the single bin system was the delay resulting from the image analysis time required to select a holdsite. This source of delay was substantially masked in the dual bin system because more arm motions were overlapped with the image analysis tank. Other sources of cycle time variations came from variations in the distance the arm travelled due to the location of the selected holdsite in the bin and variations in the distance travelled along the line of sight path due to the actual depth in the pile of the piece. Acquisition failures also added to the overall cycle time; however, the statistical effect of these failures was small in the experiments run.

Having described our invention, what we now claim is:

1. A robot system for acquiring unoriented unmodified workpieces from a bin which comprises:
    (a) a robot assembly which includes a clamping-type hand secured to an arm, the arm adapted to position the hand in space and rotate the hand about at least one axis relative to a bin, the hand adapted to engage and disengage workpieces stored in the bin, at least some of the workpieces having arbitrary orientation angles in three rotational degrees of freedom, the workpieces being structurally distinct from sensing means;
    (b) sensing means positioned to view the workpieces in the bin and to provide data corresponding to the workpieces in the bin which data is sufficient for the selection of a holdsite;
    (c) means to store data; and,
    (d) a computer communicating with the robot assembly, the sensing means and the means to store the data which includes:
        means to select a holdsite on a workpiece in the bin;
        means to relate coordinates of the sensing means with the coordinates of the band; and,
        means to transmit data to the robot assembly to cause the hand to engage the workpiece at the selected holdsite and to remove, subsequently, the workpiece from the bin.

2. The system of claim 1 wherein the sensing means is a non-tactile sensor.

3. The system of claim 1 wherein the sensing means measures range to provide three-dimensional data.

4. The system of claim 2 wherein the sensing means is an imaging device.

5. The system of claim 4 wherein the imaging device is a video camera.

6. The system of claim 4 wherein the imaging device includes more than one video camera, each camera positioned to view workpieces in a bin so that at least one camera has a clear view of some of the workpieces.

7. The system of claim 1 wherein the hand employs fingers having fingertips to clamp the workpiece.

8. The system of claim 7 wherein the hand includes means to sense when a workpiece is between the fingertips.

9. The system of claim 7 wherein the hand includes means to sense excessive forces and torques applied to the hand.

10. The system of claim 9 wherein the means to secure the hand to the arm is adapted to change compliance when excessive forces and torques are applied to the hand and return to its initial compliance when the excessive forces and torques are removed.

11. The system of claim 7 wherein the hand has fingertips which are capable of conforming to the orientation of the workpiece surface in contact with the fingertip.

12. The system of claim 7 which includes means to control the opening of the fingers.

13. The system of claim 7 wherein the hand includes vector force sensing on each fingertip.

14. The system of claim 7 wherein each fingertip has proximity sensors.

15. The system of claim 7 wherein each fingertip has a planar surface opposed and parallel to the other.

16. A method of acquiring unoriented workpieces from a bin using a clamping-type hand, the workpieces being structurally distinct from a sensing system which collects data at least some of the pieces having arbitrary orientation angles in three rotational degrees of freedom which includes:
 (a) collecting data about the unoriented workpieces in a bin by a sensing system, the data sufficient to select a holdsite for such a hand on workpieces having arbitrary orientation angles;
 (b) determining and selecting holdsites on workpieces in a bin;
 (c) locating a selected holdsite relative to the hand of a robot assembly, the robot assembly including an arm to position and rotate the hand;
 (d) moving the hand having clamping fingers to engage the selected holdsite; and,
 (e) engaging the workpiece with the fingers.

17. The method of claim 16 which includes measuring a range to provide three-dimensional data.

18. The method of claim 16 which includes collecting the data with a non-tactile sensor.

19. The method of claim 18 which includes collecting the data with an imaging device.

20. The method of claim 19 which includes collecting the data with a video camera.

21. The method of claim 16 which includes determining at least one holdsite from the collected data.

22. The method of claim 21 which includes selecting a holdsite for engagement by the hand.

23. The method of claim 22 which includes matching the collected data with a model of holdsite data, the model corresponding to holdsites which may be engaged by a clamping-type hand.

24. The method of claim 22 which includes defining a line in space passing through a selected holdsite.

25. The method of claim 24 which includes causing the arm to move the hand along the line passing through the holdsite to engage the workpiece.

26. The method of claim 22 which includes removing the workpiece from the bin.

* * * * *